(12) United States Patent
Ishikawa

(10) Patent No.: US 6,908,410 B2
(45) Date of Patent: Jun. 21, 2005

(54) THRUST BEARING AND TOROIDAL TYPE CONTINUOUSLY VARIABLE TRANSMISSION PROVIDED WITH THE SAME

(75) Inventor: Kouji Ishikawa, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/431,236

(22) Filed: May 6, 2003

(65) Prior Publication Data
US 2003/0198422 A1 Oct. 23, 2003

Related U.S. Application Data

(63) Continuation of application No. 09/595,489, filed on Jun. 14, 2000, now abandoned.

(51) Int. Cl.[7] ............................................... F16H 15/38
(52) U.S. Cl. .......................................... 476/46; 476/40
(58) Field of Search ............................. 476/40, 42, 46; 384/609

(56) References Cited

U.S. PATENT DOCUMENTS

| 5,391,126 A | 2/1995 | Fukushima et al. |
| 5,482,382 A | * 1/1996 | Sato et al. ................... 384/492 |
| 5,536,091 A | 7/1996 | Takata et al. |
| 5,720,689 A | 2/1998 | Imanishi et al. |
| 6,238,318 B1 | 5/2001 | Itoh et al. |
| 6,375,593 B2 | * 4/2002 | Miyata et al. ................. 476/40 |

FOREIGN PATENT DOCUMENTS

| JP | 7-217660 A | 8/1995 |
| JP | 7-217661 | 8/1995 |
| JP | 11-62950 A | 3/1999 |
| JP | 11-132301 A | 5/1999 |

* cited by examiner

Primary Examiner—William C. Joyce
(74) Attorney, Agent, or Firm—Christensen, O'Connor, Johnson, Kindness, PLLC

(57) ABSTRACT

In a toroidal type continuously variable transmission, a power roller bearing that serves as a thrust bearing includes an inner race composed of a part of a power roller, an outer race opposed to the inner race, and balls arranged for rolling motion between the outer and inner races. The power roller is in rolling contact with input and output disks and pressed thereby in a thrust direction. An end face of the inner race is formed having a first raceway groove having an arcuate cross section and in contact with the balls. An end face of the outer race is formed having a second raceway groove having an arcuate cross section and in contact with the balls. The second raceway groove is shallower than the first raceway groove, and the center of each of the balls is situated nearer to the inner race than a center position between the respective end faces of the outer and inner races is.

2 Claims, 4 Drawing Sheets

THRUST BEARING AND TOROIDAL TYPE CONTINUOUSLY VARIABLE TRANSMISSION PROVIDED WITH THE SAME

CROSS-REFERENCE TO RELATED APPLICATION

This is a continuation of prior U.S. patent application Ser. No. 09/595,489, filed Jun. 14, 2000, now abandoned, priority from the filing date of which is hereby claimed under 35 U.S.C. § 120.

BACKGROUND OF THE INVENTION

The present invention relates to thrust bearings used in transmissions of, for example, automobiles, general industrial machines, transport equipment, etc., and toroidal type continuously variable transmissions using the same.

As shown in FIG. 3, a toroidal type continuously variable transmission 50 comprises an input disk 52 and an output disk 53 opposed to each other, a power roller 60 interposed between the disks 52 and 53, a push mechanism (not shown) for pressing the disks 52 and 53 toward each other, etc. The input disk 52 is rotated around an axis P1 by means of a power source such as an engine. The rotation of the input disk 52 is transmitted to the output disk 53 through the power roller 60.

A trunnion 58 is provided between the input and output disks 52 and 53. As shown in FIG. 5, the trunnion 58 has a U-shaped cross section and includes pivots 57a and 57b at its opposite ends and an outer race supporting portion 59 between the pivots 57a and 57b. The trunnion 58 is located between the disks 52 and 53 for rocking motion around the pivots 57a and 57b.

The power roller 60 shown in FIG. 3 is rockably supported between the input and output disks 52 and 53 by the trunnion 58. The roller 60 is in rolling contact with both the disks 52 and 53. The power roller 60 is rotatably supported in the trunnion 58 by means of a power roller bearing 61 that serves as a thrust bearing.

As shown in FIG. 5, the power roller bearing 61 comprises an inner race including an end face 60a of the power roller 60, an outer race 63 supported in the trunnion 58, and balls 62 arranged between the roller 60 and the race 63 for rolling motion. Annular raceway grooves 64 and 65 in contact with balls 62 are formed, respectively, on end faces 60a and 63a of the power roller 60 and the outer race 63 that face each other. The respective raceway grooves 64 and 65 of the power roller 60 and the outer race 63 are formed having equal shapes (arcuate cross sections) such that the respective centers of the balls 62 are situated in the middle between the end faces 60a and 63a.

The power roller 60 is designed so that its tilt angle can be changed according to the reduction ratio of the toroidal type continuously variable transmission 50. The power roller 60, which serves as the inner race of the power roller bearing 61, is considerably thicker than the inner race of a conventional thrust bearing.

The toroidal type continuously variable transmission 50 is provided with the push mechanism for pressing the input and output disks 52 and 53 toward each other. The input disk 52 is rotated by means of the power source, and its rotation is transmitted to the output disk 53 through the power roller 60. As the push mechanism presses at least one of the disks 52 and 53, whereupon the disks 52 and 53 come into rolling contact with the power roller 60. As this is done, the power roller bearing 61 allows the power roller 60 to rotate while supporting a load in the thrust direction that acts on the roller 60.

In this toroidal type continuously variable transmission 50, a relatively heavy thrust load acts on the power roller 60 and the power roller bearing 61 during power transmission. This thrust load causes the outer race supporting portion 59 of the trunnion 58 to undergo elastic deformation such that it separates from the power roller 60, as indicated exaggeratedly by broken line Q in FIG. 5. If the trunnion 58 is deformed in this manner, the outer race 63 that is supported by the trunnion 58 is also deformed, so that the respective raceway grooves 64 and 65 of the power roller 60 and the outer race 63 cease to be able to face each other entire. Thereupon, the raceway track of the balls 62 tends to be deviated from the raceway grooves 64 and 65.

Accordingly, thrust loads that act on the raceway groove 65 of the outer race 63 through the balls 62(A) to 62(H) are uneven with respect to the circumferential direction of the outer race 63, as indicated by segments F1, F2 and F3 in FIG. 4. FIG. 4 shows three magnitudes of thrust loads F1, F2 and F3 that act on the outer race 63 when the thrust load on the power roller 60 is varied in three stages.

As seen from FIG. 4, the maximum thrust load acts on the outer race 63 through the balls 62(A) and 62(E) that are situated near the pivots 57a and 57b of the trunnion 58. The thrust loads F1, F2 and F3 lower as the balls 62 approach the axis P1, starting from the balls 62(A) and 62(E), and the minimum thrust load acts on the outer race 63 through the balls 62(C) and 62(G) that are situated near the axis P1. If the thrust load is thus uneven in the circumferential direction of the outer race 63, a part of the raceway surface of the outer race 63 may suffer flaking or the like, possibly lowering the life performance of the race 63 and the toroidal type continuously variable transmission 50 itself.

The raceway surface of the outer race 63 can be prevented from flaking by improving the stiffness of the race 63. Since the outer race 63 of the toroidal type continuously variable transmission 50 is supported by means of the trunnion 58, however, it is structurally hard to enhance the stiffness by increasing the thickness of the race 63. Conventionally, there is a proposal that the stiffness of the outer race 63 should be improved by enhancing the stiffness of the trunnion 58 in order to prevent the flaking on the raceway surface of the outer race 63. If the stiffness of the trunnion 58 is enhanced, however, the trunnion 58 is inevitably large-sized, so that the transmission 50 itself is also large-sized.

BRIEF SUMMARY OF THE INVENTION

Accordingly, a first object of the present invention is to provide a thrust bearing capable of preventing flaking on the raceway surface of an outer race. A second object of the invention is to provide a toroidal type continuously variable transmission capable of preventing flaking on the raceway surface of an outer race and restraining an increase in size.

In order to achieve the first object described above, a thrust bearing according to the present invention comprises: an inner race pressed by a rotating disk; an outer race having an end face opposed to an end face of the inner race; balls arranged for rolling motion between the inner and outer races; a first raceway groove with an arcuate cross section, formed in the shape of a circular ring on the end face of the inner race and in contact with the balls; and a second raceway groove with an arcuate cross section, formed in the shape of a circular ring on the end face of the outer race and in contact with the balls, the second raceway groove being shallower than the first raceway groove and the center of each of the balls being situated nearer to the inner race than a center position between the respective end faces of the outer and inner races is.

In the thrust bearing of the invention, the second raceway groove (raceway groove of the outer race) is shallower than the first raceway groove (raceway groove of the inner race), and the center of each ball is situated nearer to the inner race than the center position between the respective end faces of the outer and inner races is. Accordingly, the stiffness of the outer race increases. If a large thrust load acts on the outer race through the balls, therefore, the outer race can be restrained from being elastically deformed. Accordingly, the thrust load in the circumferential direction of the outer race can be restrained from becoming uneven, and flaking of the raceway surface of the outer race can be prevented.

In order to achieve the second object, a toroidal type continuously variable transmission according to the invention comprises: an input disk rotatable by means of a power source; an output disk opposed to the input disk; a power roller interposed between and pressed by the input and output disks; and a thrust bearing supporting the power roller, the thrust bearing including an inner race composed of a part of the power roller, an outer race having an end face opposed to an end face of the inner race, balls arranged for rolling motion between the inner and outer races, a first raceway groove with an arcuate cross section, formed in the shape of a circular ring on the end face of the inner race and in contact with the balls, and a second raceway groove with an arcuate cross section, formed in the shape of a circular ring on the end face of the outer race and in contact with the balls, the second raceway groove being shallower than the first raceway groove and the center of each of the balls being situated nearer to the inner race than a center position between the respective end faces of the outer and inner races is.

This toroidal type continuously variable transmission is characterized in that the second raceway groove (raceway groove of the outer race) of a power roller bearing that serves as the thrust bearing is shallower than the first raceway groove (raceway groove of the inner race), and that the center of each ball is situated nearer to the inner race than the center position between the respective end faces of the outer and inner races is.

According to the present invention, the stiffness of the outer race can be enhanced without increasing the stiffness of the trunnion. Since the stiffness of the outer race is enhanced, the outer race can be restrained from being elastically deformed if the input and output disks apply a large thrust load to the outer race through the power roller and the balls. Accordingly, the thrust load in the circumferential direction of the outer race can be restrained from becoming uneven, and flaking of the raceway surface of the outer race can be prevented. Since the stiffness of the outer race can be enhanced without increasing the stiffness of the trunnion, moreover, the toroidal type continuously variable transmission can be restrained from becoming large-sized.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will now be described with reference to FIGS. 1, 2A and 2B.

Figure 1:
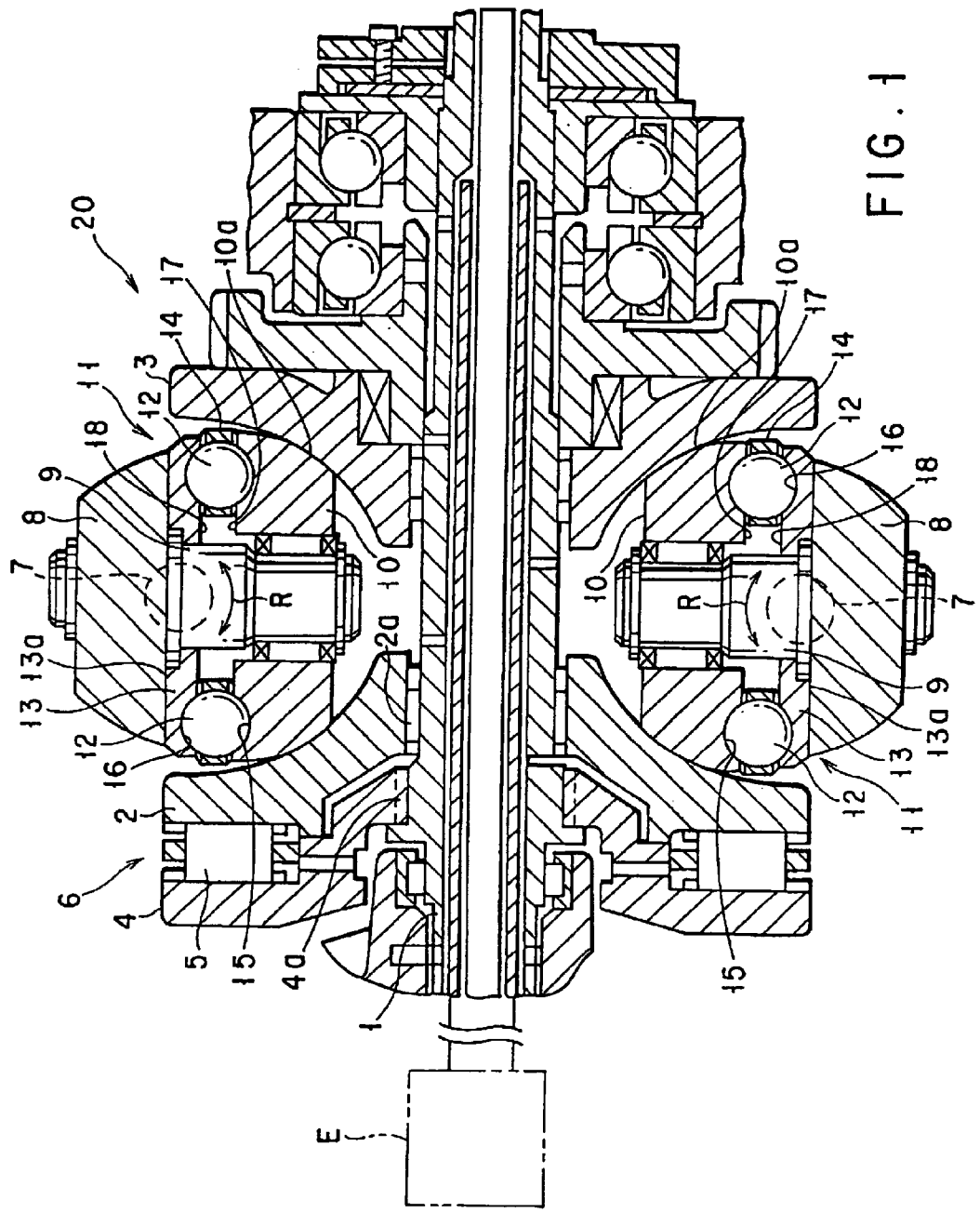
FIG. 1 is a sectional view showing a part of a single-cavity half-toroidal type continuously variable transmission according to an embodiment of the present invention.

A single-cavity half-toroidal type continuously variable transmission 20 shown in FIG. 1 comprises an input shaft 1 rotatable by means of a power source E that includes an engine or the like, an input disk 2, an output disk 3, power rollers 10 of steel, a push mechanism 6, etc. The input disk 2 is rotatably supported on the input shaft 1 by means of a bearing 2a. The output disk 3 is supported by the shaft 1 and opposed to the input disk 2. The output disk 3 rotates in association with an output shaft for fetching the rotation of the input shaft 1.

The power rollers 10 are interposed between the input and output disks 2 and 3. Each roller 10 has a traction surface 10a that is in rolling contact with the disks 2 and 3.

The push mechanism 6 is located behind the input disk 2. The mechanism 6 is provided with a loading cam 4 and a cam roller 5 at the back of the input disk 2. The loading cam 4, which has a spline portion 4a fitted on the input shaft 1, can rotate integrally with the shaft 1. The cam roller 5 is interposed between the loading cam 4 and the input disk 2. The cam 4 and the roller 5 constitute the push mechanism 6. When the loading cam 4 rotates integrally with the input shaft 1, the cam roller 5 presses the input disk 2 toward the output disk 3. Thereupon, the cam 4, roller 5, and disk 2 rotate integrally with the input shaft 1.

Trunnions 8 are provided between the input and output disks 2 and 3. Each trunnion 8 can rock in the direction indicated by arrow R in FIG. 1 around a pivot 7. A displacement shaft 9 is provided in the central portion of each trunnion 8. Each power roller 10 is rotatably supported on the shaft 9. The roller 10 between the input and output disks 2 and 3 can change its inclination in the direction of arrow R around the pivot 7, depending on the gear ratio between the disks. A part of each power roller 10 including an end face 17 thereof constitutes the inner race of a power roller bearing 11.

The power roller bearing 11, which serves as a thrust bearing, is provide between each trunnion 8 and its corresponding power roller 10. As shown in FIG. 2A, the power roller bearing 11 comprises the end face 17 of the power roller 10 that serves as its inner race, an outer race 13, a plurality of balls 12 as rolling elements, and a retainer 14.

The outer race 13, which is in the form of a circular ring, has its end face 13a supported on the trunnion 8. Each ball 12 is spherical. The balls 12 are held between the power roller 10 and the outer race 13 for rolling motion. The ring-shaped retainer 14 is located between the roller 10 and the race 13. The retainer 14 holds the balls 12 for rolling motion. The power roller bearing 11 is supported integrally with the trunnion 8 for rocking motion between the input and output disks 2 and 3.

The push mechanism 6 presses the input disk 2 toward the output disk 3, so that the disks 2 and 3 come into rolling contact with the traction surface 10a of the power roller 10. Thus, the driving force of the input disk 2 that is rotated by means of the power source E is transmitted to the output disk 3 through the roller 10, whereupon the power of power source E is fetched.

When the input and output disks 2 and 3 come into rolling contact with the power roller 10 as the push mechanism 6 presses the input disk 2, the roller 10 is pressed in the thrust direction. The power roller bearing 11 supports a load in the thrust direction that acts on the power roller 10 from the input and output disks 2 and 3, and allows the roller 10 to rotate. This thrust load is transmitted to the trunnion 8 through the outer race 13.

Figure 2A:
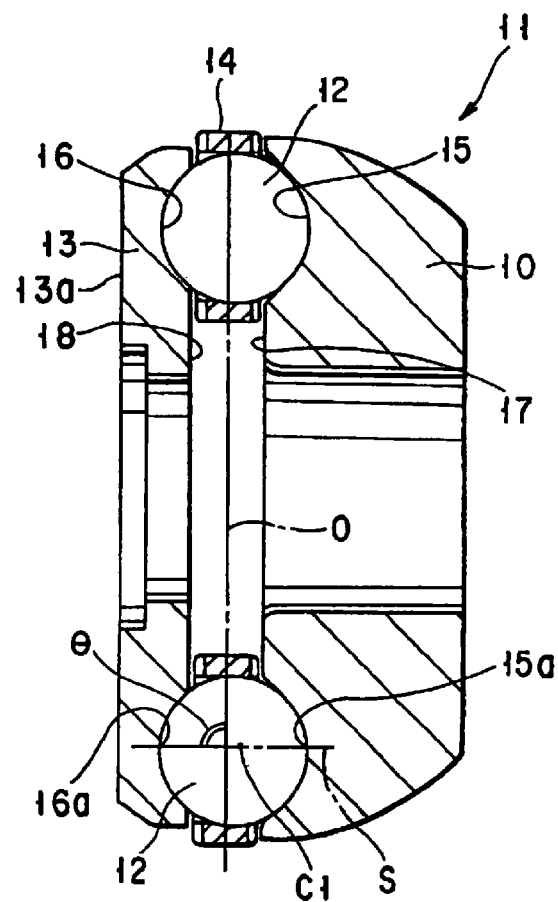
FIG. 2A is a sectional view of a power roller bearing used in the transmission shown in FIG. 1.

As shown in FIG. 2A, the thrust-direction end face 17 of the power roller 10 that faces the outer race 13 is formed having an annular first raceway groove 15 with which the balls 12 are in rolling contact. An end face 18 of the outer race 13 that faces the power roller 10 is formed having an annular second raceway groove 16 with which the balls 12 are in rolling contact. The respective cross sections of these raceway grooves 15 and 16 are arcuate.

Figure 2B:
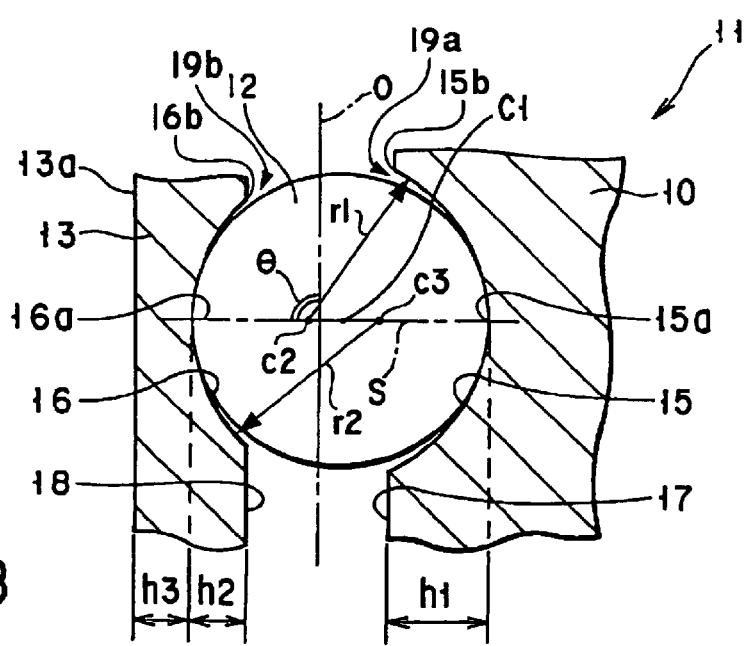
FIG. 2B is an enlarged sectional view showing a part of the power roller bearing shown in FIG. 2A.
Figure 3:
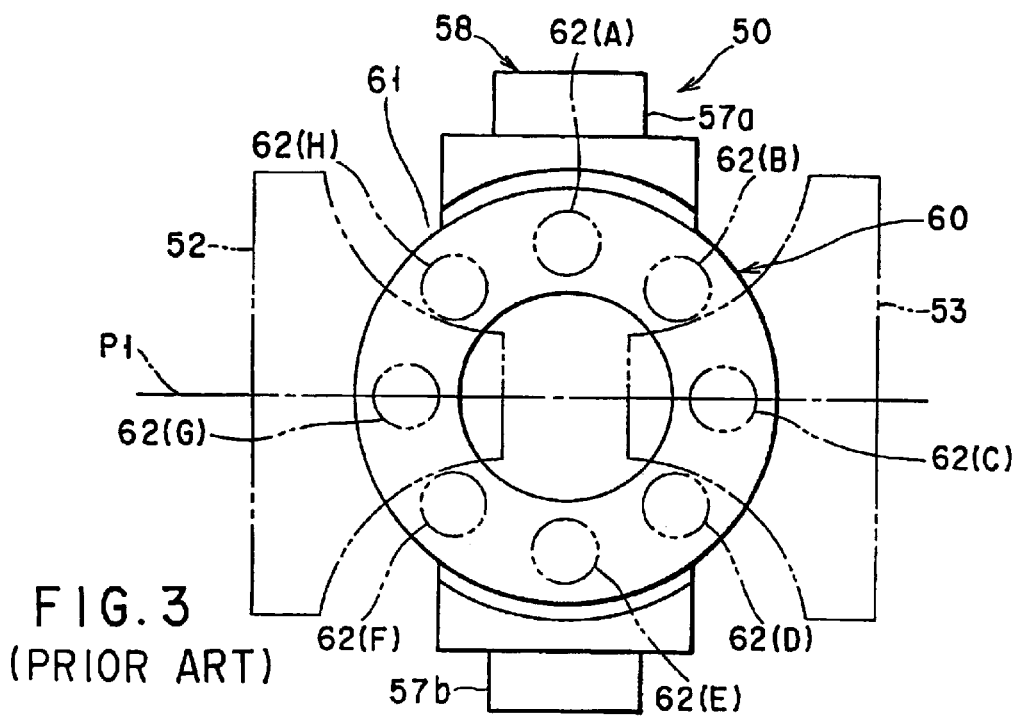
FIG. 3 is a front view showing a part of a conventional toroidal type continuously variable transmission.
Figure 4:
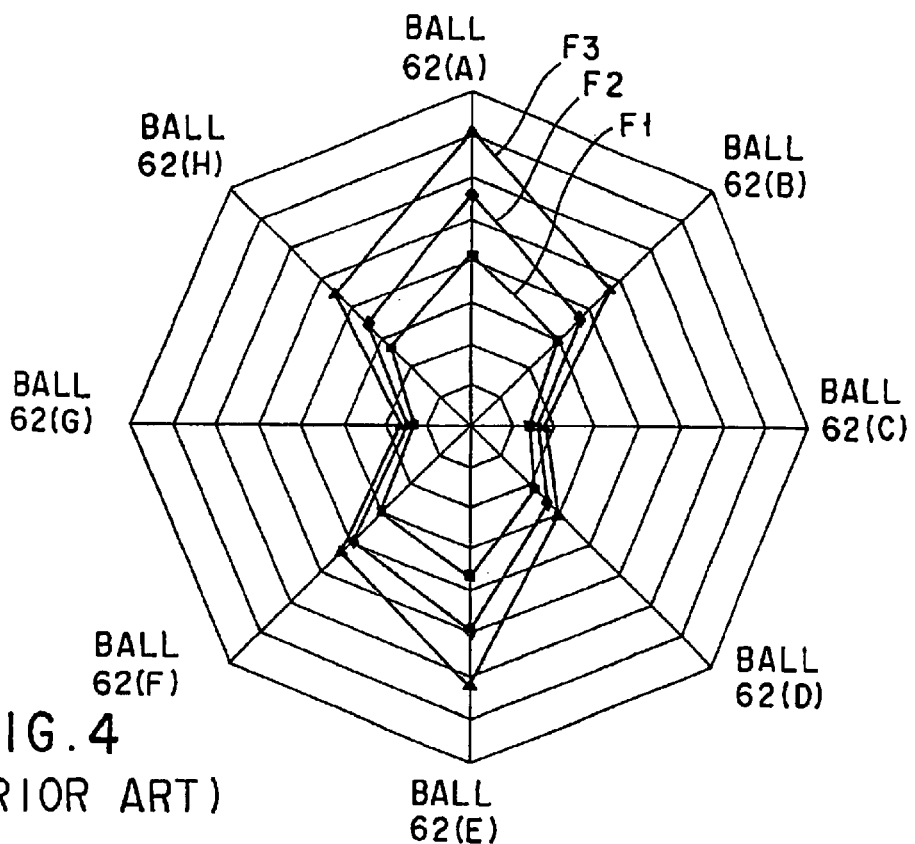
FIG. 4 is a diagram showing the distribution of thrust load in the circumferential direction of an outer race of a power roller bearing of the transmission shown in FIG. 3; and, FIG. 5 is a sectional view of a trunnion of the toroidal type continuously variable transmission shown in FIG. 3.
Figure 5:
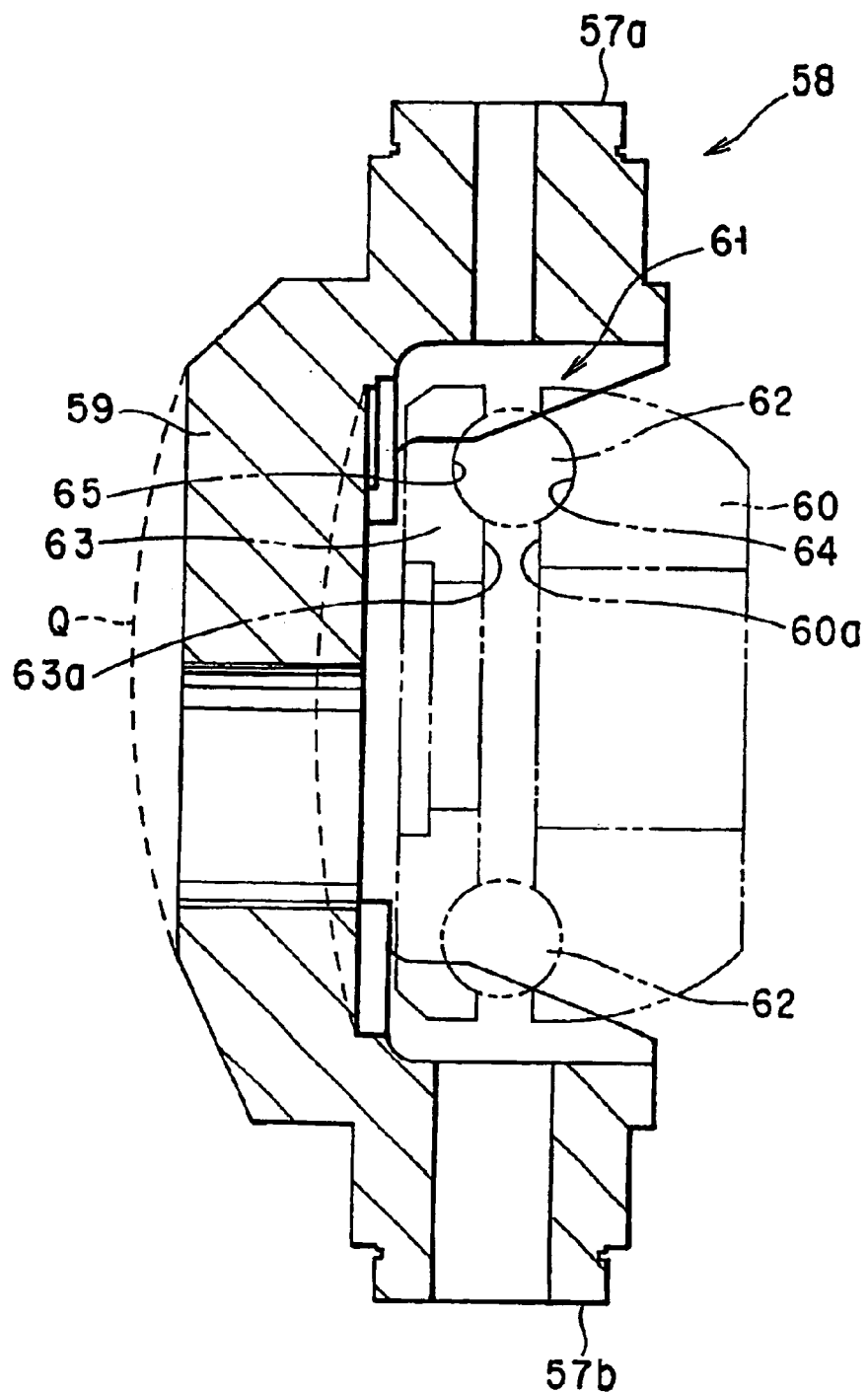

As shown in FIG. 2B, the depth of the second raceway groove 16, that is, a distance h2 from the end face 18 of the outer race 13 to a groove bottom 16a, is smaller than the depth of the first raceway groove 15, that is, a distance h1 from the end face 17 of the power roller 10 to a groove bottom 15a. Therefore, a center C1 of each ball 12 that is held between the raceway grooves 15 and 16 is situated nearer to the end face 17 of the roller 10 than a center line O between the end faces 17 and 18 is. A distance h3 from the groove bottom 16a of the second raceway groove 16 to the back surface 13a of the outer race 13 corresponds to a dimension (thickness) that is large enough to ensure the stiffness of the outer race 13 against the aforesaid thrust load thereon.

Also as shown in FIG. 2B, in one embodiment, the distance h3 from the groove bottom 16a to the back surface 13a of the outer race 13 is less than a radius of curvature r1 of the arcuate cross section of the first raceway groove 15 with respect to center C2, and is also less than a radius of curvature r2 of the arcuate cross section of the second raceway groove 16 with respect to center C3. Further, in one embodiment, the radius of curvature r1 and r2 is each greater than the radius of the balls 12 (the center of the balls is C1). As such, a first gap 19a is created between an edge 15b of the first raceway groove 15 on the end face 17 of the inner race (comprising a portion of the power roller 10) and the balls 12. Likewise, a second gap 19b is created between an edge 16b of the second raceway groove 16 on the end face 18 of the outer race 13 and the balls 12. As further illustrated in FIG. 2B, in one embodiment, the first gap 19a associated with the inner race is greater than the second gap 19b associated with the outer race 13.

The groove bottom 15a of the first raceway groove 15 is located on the geometric center (point of contact) of a plane in which the power roller 10 and each ball 12 are in contact with each other. The groove bottom 16a of the second raceway groove 16 is located on the geometric center (point of contact) of a plane in which each ball 12 and the outer race 13 are in contact with each other. An angle θ between the center line O and a segment S that connects the groove bottoms 15a and 16a or the points of contact is 90°. This power roller bearing 11 serves as a thrust ball bearing.

In the power roller bearing 11 of the toroidal type continuously variable transmission 20 of this embodiment, the depth h2 of the raceway groove 16 of the outer race 13 is smaller than the depth h1 of the raceway groove 15 of the power roller 10, and the center C1 of each ball 12 is situated nearer to the power roller 10 than the center line O between the end faces 17 and 18 is. Thus, the stiffness of the outer race 13 can be enhanced without increasing the stiffness of the trunnion 8.

If a large thrust load from the input and output disks 2 and 3 is applied to the power roller bearing 11 through the balls 12, therefore, the outer race 13 can be restrained from being elastically deformed. Accordingly, the thrust load in the circumferential direction of the outer race 13 can be restrained from becoming uneven, and partial flaking of the raceway surface of the raceway groove 16 can be prevented. Thus, the life performance of the power roller bearing 11 and the toroidal type continuously variable transmission 20 can be restrained from lowering. Since the stiffness of the outer race 13 can be enhanced without increasing the stiffness of the trunnion 8, moreover, the transmission 20 can be restrained from becoming large-sized.

In the conventional power roller bearing, the first and second raceway grooves 15 and 16 have the same depth (h1=h2). If the distance h3 from the groove bottom 16a to the back surface 13a of the outer race 13 is long enough to ensure the stiffness of the race 13, the thickness (h2+h3) of the race 13 can be reduced without lowering its stiffness by making the depth h2 of the second raceway groove 16 smaller than the depth h1 of the first raceway groove 15, as in the case of the present invention. Thus, the toroidal type continuously variable transmission itself can be downsized.

The toroidal type continuously variable transmission 20 according to the embodiment described above is of the single-cavity type that is provided with a pair of disks, the input and output disks 2 and 3. However, the present invention may be also applied to power roller bearings of a double-cavity toroidal type continuously variable transmission that is provided with a plurality of pairs of disks, input and output.

Further, the thrust bearing according to the embodiment described herein is a ball bearing in which the segment S that connects the groove bottoms 15a and 16a is inclined at 90° to the center line O between the end faces 17 and 18. However, the present invention may be also applied to a thrust angular ball bearing in which the angle θ between the segment S and the center line O is narrower (e.g., 80° or 70°) or wider than 90°.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A thrust bearing comprising:
   an inner race pressed by a rotating disk;
   an outer race having an end face opposed to an end face of the inner race and a back surface supported by a trunnion;

balls arranged for rolling motion between the inner and outer races;

a first raceway groove with an arcuate cross section, formed in the shape of a circular ring on the end face of the inner race and in contact with the balls; and a second raceway groove with an arcuate cross section, formed in the shape of a circular ring on the end face of the outer race and in contact with the balls, wherein:

the second raceway groove is shallower than the first raceway groove and the center of each said ball is situated nearer to the inner race than a center position between the respective end faces of the outer and inner races is;

a distance between the midpoint of the second raceway groove and the back surface of the outer race is less than a radius of curvature of the arcuate cross section of the first raceway groove;

the distance between the midpoint of the second raceway groove and the back surface of the outer race is also less than a radius of curvature of the arcuate cross section of the second raceway groove, and a thickness of the outer race is less than the radius of curvature of each of the arcuate cross sections of the first and second raceway grooves, respectively.

2. A toroidal type continuously variable transmission comprising:

(a) an input disk rotatable by means of a power source;

(b) an output disk opposed to the input disk;

(c) a power roller interposed between and pressed by the input and output disks; and (d) a thrust bearing supporting the power roller, the thrust bearing comprising:

an inner race composed of a part of the power roller;

an outer race having an end face opposed to an end face of the inner race, and a back surface supported by a trunnion;

balls arranged for rolling motion between the inner and outer races;

a first raceway groove with an arcuate cross section, formed in the shape of a circular ring on the end face of the inner race and in contact with the balls; and a second raceway groove with an arcuate cross section, formed in the shape of a circular ring on the end face of the outer race and in contact with the balls, wherein:

the second raceway groove being shallower than the first raceway groove and the center of each said ball being situated nearer to the inner race than a center position between the respective end faces of the outer and inner races is;

a distance between the midpoint of the second raceway groove and the back surface of the outer race is less than a radius of curvature of the arcuate cross section of the first raceway groove;

the distance between the midpoint of the second raceway groove and the back surface of the outer race is also less than a radius of a curvature of the arcuate cross section of the second raceway groove, and the thickness of the outer race is less than the radius of curvature of each of the arcuate cross sections of the first and second raceway grooves, respectively.

* * * * *